(12) United States Patent
Kang et al.

(10) Patent No.: US 8,442,397 B2
(45) Date of Patent: May 14, 2013

(54) MODULATOR, APPARATUS FOR OBTAINING LIGHT FIELD DATA USING MODULATOR, AND APPARATUS AND METHOD FOR PROCESSING LIGHT FIELD DATA USING MODULATOR

(75) Inventors: Joo-Young Kang, Yongin-si (KR); Byung-Kwan Park, Seoul (KR); Sang-Wook Han, Seoul (KR); Seong-Deok Lee, Suwon-si (KR); Won-Hee Choe, Hwaseong-si (KR); Jae-Guyn Lim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 264 days.

(21) Appl. No.: 12/885,136

(22) Filed: Sep. 17, 2010

(65) Prior Publication Data

US 2011/0069324 A1    Mar. 24, 2011

(30) Foreign Application Priority Data

Sep. 22, 2009    (KR) .................. 10-2009-0089780

(51) Int. Cl.
*G03B 41/00* (2006.01)
(52) U.S. Cl.
USPC ........................................ 396/268; 396/322
(58) Field of Classification Search .................. 396/268, 396/322, 332
See application file for complete search history.

(56) References Cited

U.S. PATENT DOCUMENTS

| 2006/0204861 A1 | 9/2006 | Ben-Eliezer et al. | |
|---|---|---|---|
| 2007/0040828 A1 | 2/2007 | Zalevsky et al. | |
| 2008/0187305 A1 | 8/2008 | Raskar et al. | |
| 2009/0041448 A1* | 2/2009 | Georgiev et al. | 396/268 |

FOREIGN PATENT DOCUMENTS

| EP | 1 956 410 | 8/2008 |
|---|---|---|
| JP | 2006-319932 | 11/2006 |
| JP | 2008-167395 | 7/2008 |
| JP | 2008-191661 | 8/2008 |
| KR | 10-2006-0115961 | 11/2006 |
| WO | WO 03/021333 | 3/2003 |

OTHER PUBLICATIONS

Veeraraghavan et al., "Dappled Photography: Mask Enhanced Cameras for Heterodyned Light Fields and Coded Aperture Refocusing" *In Proceedings of the International Conference on Computer Graphics and Interactive Techniques*, 2007, pp. 1-12.
European Search Report issued on Nov. 24, 2010, in corresponding European Patent Application No. 10177269.7 (6 pages).
Georgiev et al., "Spatio-Angular Resolution Tradeoff in Integral Photography," *Eurographics Symposium on Rendering*, 2006, pp. 1-10. URL: http://www.tgeorgiev.net/Spatioangular.pdf.

* cited by examiner

*Primary Examiner* — W. B. Perkey
(74) *Attorney, Agent, or Firm* — NSIP Law

(57) ABSTRACT

A technology of acquiring and processing light field data for images is provided. A light field data acquisition apparatus includes a modulator with an attenuation pattern to spatially modulate a 4D light field for an image, and a sensor to acquire 2D signals of the spatially modulated 4D light field. By utilizing the attenuation pattern of the modulator, more spatial data may be acquired in a low angular frequency region than that acquired in a high angular frequency region.

38 Claims, 7 Drawing Sheets

1D NON-HARMONIC PATTERN    2D NON-HARMONIC PATTERN

Value : 0   Value : 0.5   Value : 1

310   320   330

610

MODULATOR, APPARATUS FOR OBTAINING LIGHT FIELD DATA USING MODULATOR, AND APPARATUS AND METHOD FOR PROCESSING LIGHT FIELD DATA USING MODULATOR

CROSS-REFERENCE TO RELATED APPLICATION(S)

This application claims the benefit under 35 U.S.C. §119(a) of Korean Patent Application No. 10-2009-89780, filed on Sep. 22, 2009, the entire disclosure of which is incorporated herein by reference for all purposes.

BACKGROUND

1. Field

The following description relates to image processing, and more particularly, to a technology of acquiring and processing light field data using a modulator to spatially modulate a four-dimensional (4D) light field of an image in a frequency domain.

2. Description of the Related Art

Most commercialized imaging systems show captured pictures in a single image. Recently, studies on plenoptic cameras that refocus images have been conducted. A plenoptic camera, which is also called a light field camera, obtains four-dimensional (4D) light field information of images using a microlens array (generally, a lenticular lens). The plenoptic camera provides users with various functions, such as the option to refocus an image which allows a focus plane of an image to be adjusted after the image has been taken. The plenoptic camera also allows a user the ability to view variations of an image at different view angles.

In order to acquire such light field data, angular data regarding light orientation has to be acquired as well as spatial data regarding the number of sensor pixels. As a result, resolution deterioration often occurs when obtaining the angular data. Accordingly, conventional light field imaging has failed to create high-resolution images. Because the resulting 4D data is two-dimensional (2D) spatial data plus 2D angular data received from a 2D sensor, the resolution of spatial data is lowered by the amount of angular data. For example, if 12×12 (that is, 144) pieces of angular data are needed to meet a degree of angular resolution of a lens, the resulting resolution will be reduced to $1/144$ of a maximum resolution that is attained through the use of all the sensor pixels.

In addition, conventional light field systems apply uniform sampling to spatial data. The light field systems utilize either a microlens array or a light modulator. The microlens array has to be subjected to uniform sampling due to its structure in which microlenses having the same size are arranged. Likewise, in the case of a light modulator, uniform sampling is used under an assumption that spatial and angular bandwidths are uniformly assigned.

That is, existing modulators for spatially modulating light fields have been designed under an assumption that spatial data has the same bandwidth for each band of orientation data in a frequency domain. Accordingly, frequency responses created by such existing modulators appear at uniform intervals with respect to spatial data.

However, when the image information of light field data is transformed to the frequency domain, a phenomenon occurs wherein the higher the frequency domain, the less spatial data.

SUMMARY

In one general aspect, there is provided an apparatus for acquiring light field data to create an image, the apparatus including: a modulator including an attenuation pattern configured to spatially modulate a four dimensional (4D) light field image in the frequency domain, and a sensor configured to acquire two-dimensional (2D) signals of the spatially modulated 4D light field, wherein the attenuation pattern is configured to generate frequency responses of the 2D signals, dependent on position, through the spatial modulation in the frequency domain.

The apparatus may further include that the modulator includes: a transparent layer, and a metal layer mounted on the transparent layer which forms the attenuation pattern and configured to attenuate light passing through the transparent layer to different degrees.

The apparatus may further include that the attenuation pattern is configured to generate a plurality of grey-scale values by: dividing unit patterns of the attenuation pattern into a plurality of sections that each include a plurality of units, and shielding one or more of the units of each section to generate a grey-scale for each section.

The apparatus may further include that the attenuation pattern is configured to acquire more spatial data in a low angular frequency region and less spatial data in a high angular frequency.

In another general aspect, there is provided an apparatus for processing light field data to create an image, the apparatus including: a modulator including an attenuation pattern configured to spatially modulate a four dimensional (4D) light field image, a sensor configured to acquire two-dimensional (2D) signals of the spatially modulated 4D light field, and a data processor configured to restore 4D light field data using the 2D signals, wherein the attenuation pattern is further configured to generate frequency responses of the 2D signals dependent on position through the spatial modulation in the frequency domain.

The apparatus may further include that the modulator includes: a transparent layer, and a metal layer mounted on the transparent layer which forms the attenuation pattern and configured to attenuate light passing through the transparent layer to different degrees.

The apparatus may further include that the attenuation pattern is further configured to generate a plurality of grey-scale values by: dividing unit patterns of the attenuation pattern into a plurality of sections that each include a plurality of units, and shielding one or more of the units of each section to generate a grey-scale for each section.

The apparatus may further include that the attenuation pattern is further configured to acquire more spatial data in a low angular frequency region and less spatial data in a high angular frequency.

The apparatus may further include that the data processor is further configured to: apply Fourier transformation to the 2D signals acquired by the sensor to create 2D tiles, perform zero-padding on at least one of the 2D tiles to make the sizes of the 2D tiles uniform, reconfigure the 2D tiles subjected to the zero-padding into a 4D tile stack, and apply an inverse-Fourier transformation to the 4D tile stack to restore 4D light field image.

The apparatus may further include that the data processor is further configured to perform the zero-padding to cause the 2D tiles to have a same size as that of the largest 2D tile from among the 2D tiles.

The apparatus may further include that the data processor is further configured to create at least one image from among a view image from at least one angle, a refocusing image at different depths, and a high-resolution image, using the restored 4D light field data.

In another general aspect, there is provided a light field data processing method that is performed by a light field data processor, the method including: spatially modulating a 4D light field image using a modulator with an attenuation pattern to acquire 2D signals of the spatially modulated 4D light field, and restoring 4D light field data using the 2D signals, wherein the attenuation pattern generates frequency responses of the 2D signals dependent on position through the spatial modulation in the frequency domain.

The light field data processing method may further include that the restoring of the 4D light field data includes: applying a Fourier transformation to the 2D signals to acquire 2D tiles, performing zero-padding on at least one of the 2D tiles to make sizes of the 2D tiles uniform, reconfiguring the 2D tiles subjected to the zero-padding to a 4D tile stack, and performing an inverse-Fourier transformation on the 4D tile stack to restore the 4D light field image.

The light field data processing method may further include that the zero-padding is performed in such a manner that the 2D tiles have a same size as that of the largest 2D tile from among the 2D tiles.

The light field data processing method may further include creating at least one image from among a view image from at least one angle for the scene, a refocusing image at different depths, and a high-resolution image, using the restored 4D light field data.

In another general aspect, there is provided a modulator for spatially modulating light in a frequency domain, the modulator including: a transparent layer, and a metal layer mounted on the transparent layer that forms an attenuation pattern and configured to attenuate light passing through the transparent layer to different degrees, wherein the attenuation pattern is configured to generate frequency responses of two dimensional (2D) signals dependent on position through the spatial modulation in the frequency domain.

The modulator may further include that the metal layer is further configured to generate a plurality of grey-scale values by: dividing unit patterns of the attenuation pattern into a plurality of sections that each include a plurality of units, and shielding one or more of the units of each section to generate a grey-scale for each section.

The modulator may further include that the attenuation pattern is further configured to acquire more spatial data in a low angular frequency region and less spatial data in a high angular frequency.

In another general aspect, there is provided an image processing apparatus, including: a data acquiring unit configured to receive a four-dimensional (4D) light field image and generates a plurality of non-uniform two-dimensional (2D) frequency response signals through spatial modulation in the frequency domain, and a processor configured to process a plurality of sensed non-uniform 2D frequency response signals to generate 4D light field data.

The image processing apparatus may further include that the data acquiring unit includes a modulator that includes a non-harmonic attenuation pattern configured to attenuate light passing through into the plurality of non-uniform 2D frequency response signals.

The image processing apparatus may further include that: the data acquiring unit further includes a lens and a plurality of sensors configured to sense the non-uniform 2D frequency response signals, and the modulator is positioned between the lens and the plurality of sensors.

The image processing apparatus may further include that: the plurality of sensors are divided into sections, each section includes a plurality of units, and the non-harmonic attenuation pattern is further configured to block one or more units of a section to generate a grey-scale value for that section.

The image processing apparatus may further include that the non-harmonic pattern is designed by combining two or more cosine signals that have a sum that has a non-harmonic characteristic.

The image processing apparatus may further include that the non-harmonic pattern is designed by combining two or more sine signals that have a sum that has a non-harmonic characteristic.

The image processing apparatus may further include that the non-harmonic pattern is designed by combining a combination of cosine signals and sine signals that have a sum that has a non-harmonic characteristic.

The image processing apparatus may further include that the attenuation pattern is further configured to acquire more spatial data in a low angular frequency region where more spatial data is present and less spatial data in a high angular frequency where less spatial data is present.

The image processing apparatus may further include that the processor is further configured to apply a Fourier transformation to the sensed non-uniform 2D frequency response signals to acquire 2D tiles.

The image processing apparatus may further include that the processor is further configured to perform zero-padding on at least one 2D tile to adjust a size of the 2D tiles to be uniform.

The image processing apparatus may further include that the processor is further configured to: reconfigure the 2D tiles that have been subjected to zero-padding into a 4D tile stack, and apply an inverse-Fourier transform to the 4D tile stack to generate a 4D light field image.

The image processing apparatus may further include that a result of the zero-padding is that the 2D tiles have the same size as that of the largest 2D tile from among the 2D tiles.

In another general aspect, there is provided an optical mask for use in the processing of a four-dimensional (4D) image, the optical mask including: a transparent layer, and a metal layer attached to the transparent layer and including an attenuation pattern configured to: receive a four-dimensional (4D) light field image, and attenuate the 4D light image passing through into a plurality of non-uniform two dimensional (2D) frequency response signals through spatial modulation in the frequency domain.

The optical mask may further include that the attenuation pattern includes a plurality of sections including a plurality of units such that each of the units is spaced apart in a range of approximately 0.1 μm to approximately 10 μm.

The optical mask may further include that one or more of the units of a section are blocked to prevent light from passing through and to generate a grey-scale value for that section.

The optical mask may further include that the attenuation pattern includes a 2D non-harmonic pattern.

The optical mask may further include that the non-harmonic pattern is designed by combining two or more cosine signals that have a sum that has a non-harmonic characteristic.

The optical mask may further include that the non-harmonic pattern is designed by combining two or more sine signals that have a sum that has a non-harmonic characteristic.

The optical mask may further include that the non-harmonic pattern is designed by combining a combination of sine signals and cosine signals that have a sum that has a non-harmonic characteristic.

The optical mask may further include that the attenuation pattern is further configured to acquire more spatial data in a low angular frequency region and less spatial data in a high angular frequency.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

Figure 1:
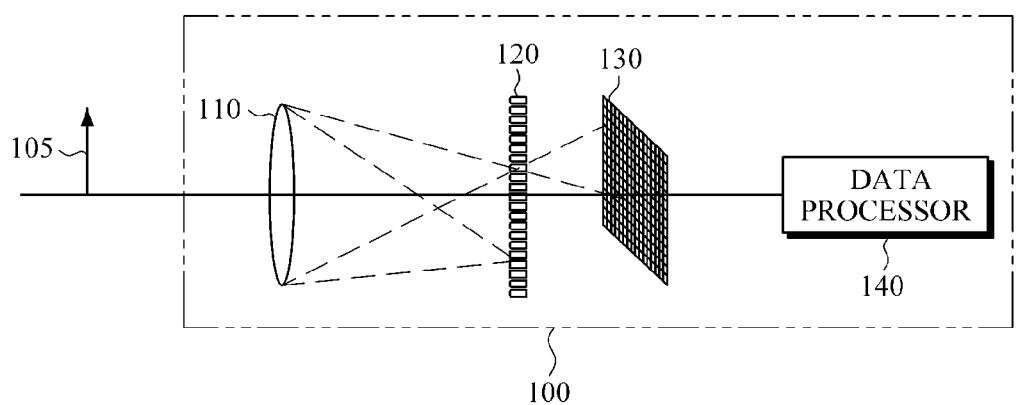
FIG. 1 is a diagram illustrating an example of a light field data processor.

FIG. 1 illustrates an example of a light field data processor.

Referring to FIG. 1, light field data processor 100 includes a lens 110, a modulator 120, a sensor 130, and a data processor 140. The light field data processor 100 may be a camera or an electronic device with a camera, for example, a personal computer, a mobile terminal, and the like.

An image of an object or a scene 105 may be obtained through the lens 110 and through the modulator 120 and may be transferred to the sensor 130 where it is sensed as light field data by the sensor 130.

The modulator 120 includes an attenuation pattern to spatially modulate the four-dimensional (4D) light field of a formed image. The attenuation pattern may generate frequency responses that include two-dimensional (2D) signals through spatial modulation in a frequency domain. The 2D signals may be dependent on position. For example, the attenuation pattern may make the positions of frequency responses non-uniform through spatial modulation in a frequency domain. The modulator 120 may be aligned along an optical axis. In this example, the modulator 120 is positioned between the lens 100 and sensor 130. It should be appreciated, however, that the modulator 120 may be mounted on the sensor 130.

The sensor 130 may include a plurality of pixel elements. The sensor 130 acquires a spatially modulated 4D light field of 2D signals. The light field data may be stored in a predetermined storage (not shown).

When the spatially modulated image sensed by the sensor 130 is subjected to Fourier transformation, the image information may be transformed to a frequency domain. In other words, original light field data may be restored by processing a spatially modulated image sensed by the sensor 130.

This processing is similar to a transmission scheme in which baseband signals are modulated to high-frequency signals using carrier signals and then transmitted to a remote region without energy loss. A receiver demodulates the modulated signals to restore the baseband signals. This method is widely used in various radio/communication systems. Consequently, it should be understood that the light field data processor 100 is designed to apply the transmission scheme to an optical domain.

Existing modulators for spatially modulating light fields have been designed under an assumption that spatial data has the same bandwidth for each band of orientation data in a frequency domain. Accordingly, frequency responses created by such existing modulators appear at uniform intervals with respect to spatial data.

However, when the image information of light field data is transformed to the frequency domain, a phenomenon occurs wherein the higher the frequency domain, the less spatial data. In consideration of this phenomenon, the modulator 120 may be configured to make the frequency response to 2D signals dependent on position, reducing spatial resolution in a high angular frequency region where relatively less spatial data is acquired. In addition, the modulator may be used to increase spatial resolution in a low angular frequency region where relatively more spatial data is acquired.

For this process, the modulator 120 may have a 2D non-harmonic pattern. The 2D non-harmonic pattern may be designed by combining two or more cosine signals whose sum has a non-harmonic characteristic. Examples of the modulator 120 are described with reference to FIGS. 2, 3, and 4.

Referring again to FIG. 1, the lens 110, the modulator 120, and the sensor 130 may be integrated into a light field data acquiring unit.

The data processor 140 restores 4D light field data using the 2D signals. For example, the data processor 140 applies Fourier transformation to the 2D signals sensed by the senor 130 to acquire 2D tiles and then performs zero-padding on at least one of the 2D tiles to adjust the sizes of the 2D tiles to be uniform. The data processor 140 reconfigures the 2D tiles subjected to zero-padding to a 4D tile stack, and applies inverse-Fourier transformation to the 4D tile stack, restoring 4D light field data.

For example, the data processor 140 may perform zero-padding to cause the 2D tiles to have the same size as that of the largest tile. The largest tile may correspond to spatial data in a low angular frequency region where more information exists in the light field data.

The data processor 140 may create a view image from at least one angle for the corresponding image or a refocusing image at different depths using the restored 4D light field data according to an existing 4D light field data processing method. Alternatively, the data processor 140 may create a high-resolution image using the restored 4D light field data. In addition, the data processor 140 may collect view images to create a stereoscopic three-dimensional (3D) image. Accordingly, the data processor 140 may perform image processing in various ways.

The light field data processor 100 may further include a display to display the processed images and a transmitter to transmit the images to other electronic devices.

Figure 2:
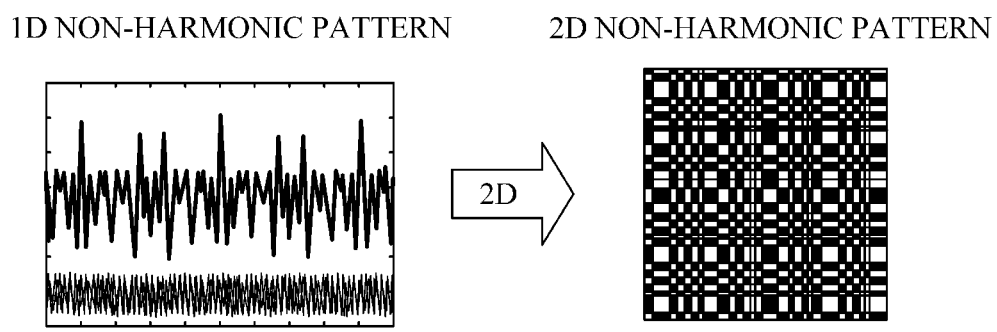
FIG. 2 is a diagram illustrating an example of a non-harmonic modulator.

FIG. 2 illustrates an example of a non-harmonic modulator.

In FIG. 2, the left part is a one-dimensional version showing the non-harmonic pattern of the modulator 120, and the right part is a two-dimensional version showing the non-harmonic pattern. For example, the non-harmonic modulator 120 may be generated by combining a plurality of cosine signals, for example, four cosine signals. As another example, the non-harmonic modulator may be generated by combining a plurality of sine signals. As yet another example, the non-harmonic modulator may be generated by combining a combination of cosine and sine signals.

Figure 3:
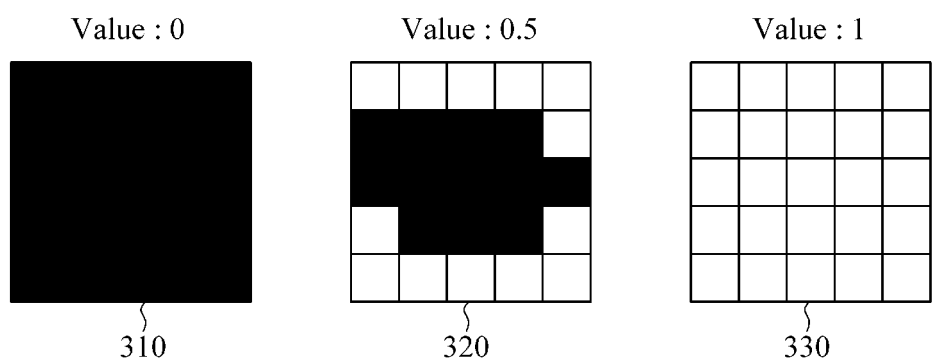
FIG. 3 is a diagram illustrating an example of a grey-scale adjustment method that is applied to a unit pattern.

FIG. 3 illustrates an example of a grey-scale adjustment control method that is applied to a unit pattern.

Existing related technologies have formed attenuation patterns in such a manner as to apply chemical solutions to films. However, the method of utilizing chemical solutions and films for pattern formation has had difficulties in forming fine patterns at a nano (i.e., micrometer (μm)) scale.

In order to provide a modulator with a precise attenuation pattern for accurate grey-scale representation, the modulator 120 may use a metal mask that is manufactured using nano-processing. As described herein, the attenuation pattern or mask may include units that are spaced apart by nanometers, to increase the spectral resolution of an image. For example, the units may be spaced apart by 0.05 μm, 0.1 μm, 0.5 μm, 1.0 μm, 2.5 μm, 5 μm, 10 μm, 25 μm, or other desired amount of distance. For example, the units may be spaced apart in a range from approximately 0.1 μm to 10 μm.

The attenuation pattern may be configured to generate a plurality of grey-scale values by dividing its unit pattern into a plurality of sections and shielding one or more units of the section. For example, a unit pattern may include one or more pixels or sensors, for example, 2 sensors, 5 sensors, 12 sensors, 25 sensors, 50 sensors, and the like. Each unit pattern may be divided into a number of sections. Each section may include a plurality of units, for example, 2 units, 5 units, 15 units, 30 units, 60 units, and the like. To produce a grey scale, some of the units may be blocked while some of the units are allowed to let light pass.

FIG. 3 illustrates three sections 310, 320, and 330 that have different grey-scale values. As illustrated in FIG. 3, the section 310 is wholly shielded to generate a grey-scale value of approximately "0", the section 320 is half shielded to generate a grey-scale value of approximately "0.5" and the section 330 is not shielded to generate a grey-scale value of approximately "1".

As shown in 320, the sensor area may be divided into sections that have a number of units. In this example, the sections include 25 units. To generate a grey-scale value, the mask can block one or more of the units, to prevent light from passing. For example, the mask may block 13 of the 25 units to generate a grey-scale value of approximately "0.5". It should be appreciated that the value of approximately "0.5" is merely for purposes of example. The grey-scale value may be adjusted to any desired value.

Figure 4:
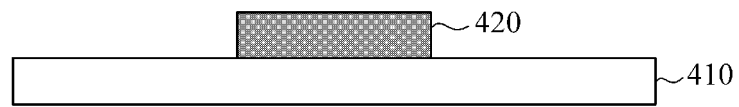
FIG. 4 is a diagram illustrating an example of a cross-sectional view of a non-harmonic modulator.

FIG. 4 illustrates an example of a cross-sectional view of a non-harmonic modulator.

The modulator 120 may include a transparent layer 410 and a metal layer 420 that is mounted on the transparent layer 410. The metal layer 420 may be formed as an attenuation pattern to attenuate light passing through the transparent layer 410 to varying degrees. By utilizing the modulator 120 corrected light field data may be acquired.

Figure 5:
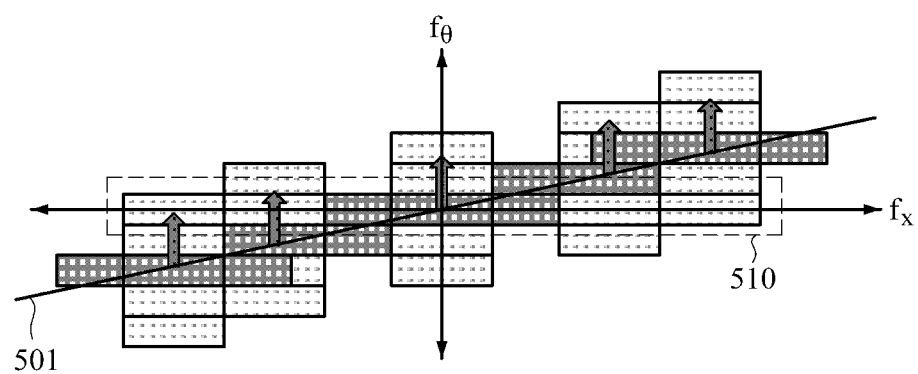
FIG. 5 is a diagram illustrating examples of spectral replicas with respect to frequency responses obtained by a non-harmonic modulator.

FIG. 5 illustrates an example of spectral replicas with respect to frequency responses obtained by the non-harmonic modulator.

FIG. 5 illustrates spectral replicas formed by the non-harmonic modulator 120 in a 2D light field space (i.e., one spatial dimension x and one angular dimension θ) when a one-dimensional (1D) sensor is utilized. In the example shown in FIG. 5, $f_x$ represents a dimension in a frequency domain with respect to the spatial dimension x, and $f_θ$ represents a dimension in a frequency domain with respect to the angular dimension θ.

Both $f_x$ and $f_θ$ have bandwidth restrictions and a slice (a dotted box) 510 denoted along the $f_x$ axis that corresponds to an image sensed by the sensor, for example, sensor 130 of FIG. 1. In this example, the frequency responses generated through light field spatial modulation by the modulator 120 are impulses as shown in FIG. 5.

When a light field is spatially modulated by the modulator 120, each impulse forms a spectral replica of the light field at its center frequency. Accordingly, as shown in FIG. 5, a plurality of spectral replicas of the light field are aligned along an oblique line 501.

The slice 510 of the modulated light field spectrum includes the information about its original light field. A tilt angle of the oblique line 501 with respect to the $f_x$ axis may be determined depending on frequency resolution required by the θ and x dimensions and a bandwidth of a received light field.

Referring to FIG. 5, each tile represents light field data. When a light field is modulated by the non-harmonic modulator 120, as illustrated in FIG. 5, frequency responses to 2D signals become dependent on position. Accordingly, the bandwidths of spatial data also become non-uniform. The modulator 120 may be configured to acquire light field data in such a manner as to acquire higher spatial resolution in a low angular frequency region and lower spatial resolution in a high angular frequency region.

Figure 6:
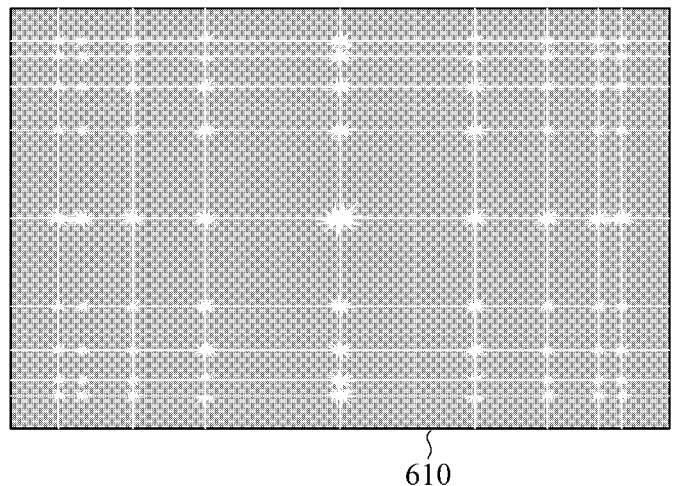
FIG. 6 is a diagram illustrating an example of an image obtained from applying Fourier transformation to two-dimensional (2D) signals obtained by a light field data processor.

FIG. 6 illustrates an example of an image obtained from applying Fourier transformation to 2D signals obtained by a light field data processor.

The image 610 may be obtained by applying Fourier transformation to 2D signals sensed by the sensor 130. As shown in the image 610 illustrated in FIG. 6, the non-harmonic modulator 120 has acquired more spatial data in a low angular frequency region (the center portion) of the image 610 and less spatial data in a high angular frequency region (the edge portions) of the image 610.

Figure 7:
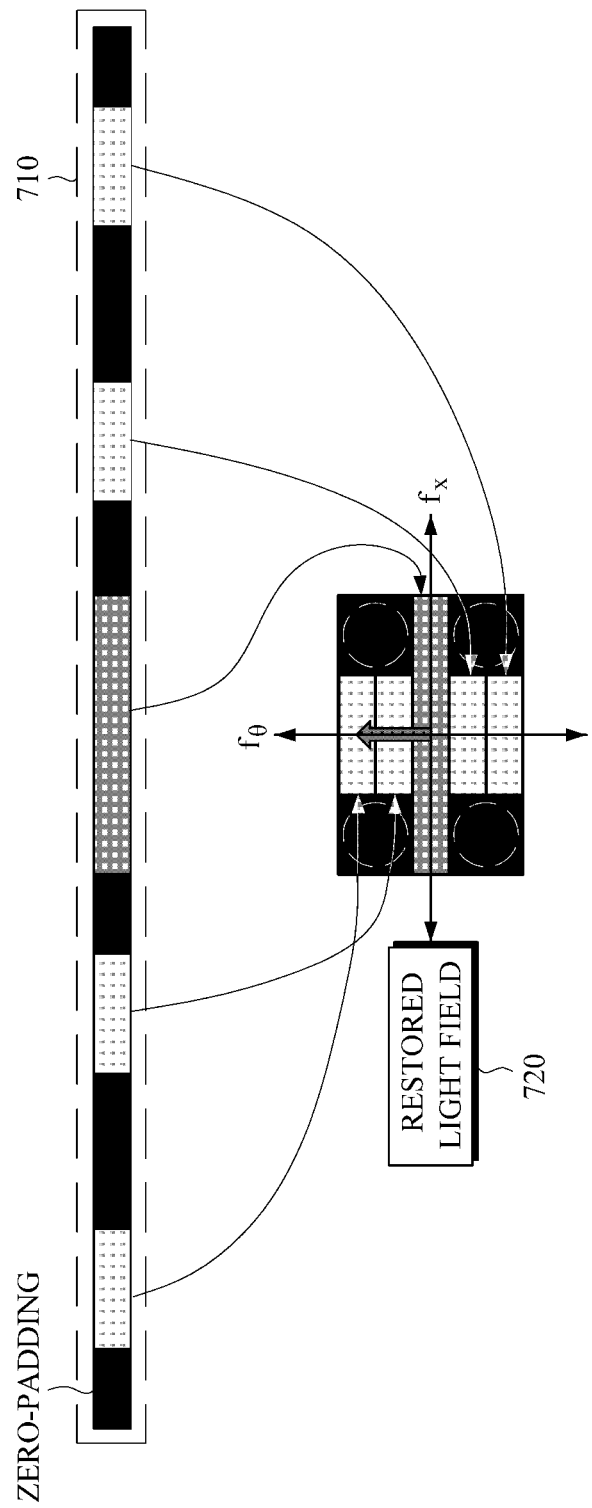
FIG. 7 is a diagram illustrating an example of a process of demodulating a light field spectrum to restore light field data.

FIG. 7 illustrates an example a process of demodulating a light field spectrum to restore light field data.

When a 1D sensor is provided and 2D light field data is processed, a process of demodulating a light field spectrum may be used to redistribute energy of sensed 1D signals into a 2D light field space.

In FIG. 7, a box 710 denoted by dotted lines represents the result obtained by applying zero-padding to the slice 510 shown in FIG. 5.

The demodulating process (denoted by arrows) rearranges frequency responses sensed by the 1D sensor to restore band-limited light field data 720. This process of restoring light field data also may be applied to restore 2D signals sensed by a 2D sensor to 4D light field data.

Spatial data in a high angular frequency region may be subjected to zero-padding in order to have the same size as spatial data in a low angular frequency region, demodulating the spatial data into 4D light field data. Inverse-Fourier transformation may be applied to the demodulated signals, obtaining an image with wholly improved spatial resolution.

Figure 8:
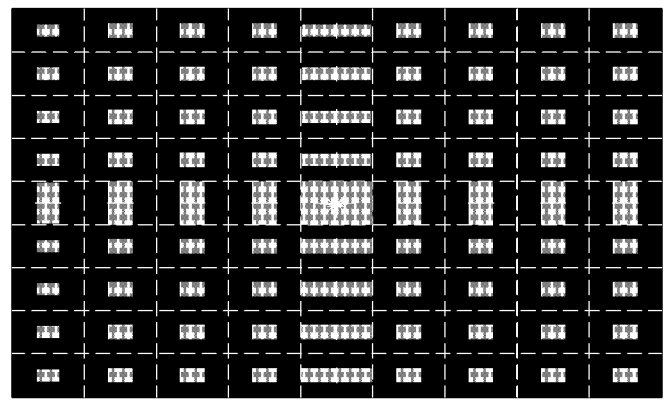
FIG. 8 is a diagram illustrating an example of an image obtained from applying zero-padding to the image shown in FIG. 6.

FIG. 8 illustrates an example of an image obtained from applying zero-padding to the image shown in FIG. 6. The image shown in FIG. 8 corresponds to the result obtained by performing zero-padding signals (see FIG. 6) sensed by a 2D sensor.

For example, because light field data is obtained by a modulator which spatially modulates a light field in a frequency domain using a non-harmonic pattern to make frequency responses to 2D signals dependent on position, images with improved spatial resolution may be created. The examples described above refer to still images. However, it should be appreciated that the non-harmonic modulator may be applied to moving images as well. In addition, the attenuation pattern of the modulator may be applied to multi-view images and moving picture images to generate a 3D picture.

As described herein, a light field may be attenuated by a non-harmonic attenuation pattern, for example, a metal mask. Accordingly, non-uniform sampling of an image may be performed to waive or dismiss unnecessary data to improve the use of the sensor and raise the quality of the spatial resolution of an image. Using a nano-level resolution, such as a metal mask that includes units that are space apart by nanometers, the limitations in the conventional file or LCD screen can be overcome.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop and/or tablet personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

The term "pixel," as used herein, refers to a photo-element unit cell containing at least a photosensor for converting photons to electrical changes. The detector or photosensor of each pixel may be implemented, as nonlimiting examples only, as a pinned photodiode, a p-n junction photodiode, a Schottky photodiode, a photogate, or any other suitable photoconversion device or device that may accumulate and/or store photocharges.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for acquiring light field data to create an image, the apparatus comprising:
    a modulator comprising an attenuation pattern configured to spatially modulate a four-dimensional (4D) light field image in the frequency domain to generate frequency responses comprising non-uniform two-dimensional (2D) signals in the frequency domain; and
    a sensor configured to acquire the non-uniform 2D signals of the spatially modulated 4D light field.

2. The apparatus of claim 1, wherein the modulator comprises:
    a transparent layer; and
    a metal layer mounted on the transparent layer which forms the attenuation pattern and configured to attenuate light passing through the transparent layer to different degrees.

3. The apparatus of claim 1, wherein the attenuation pattern is configured to generate a plurality of grey-scale values by:
    dividing unit patterns of the attenuation pattern into a plurality of sections that each comprise a plurality of units; and
    shielding one or more of the units of each section to generate a grey-scale for each section.

4. The apparatus of claim 1, wherein the attenuation pattern is configured to acquire more spatial data in a low angular frequency region and less spatial data in a high angular frequency region.

5. An apparatus for processing light field data to create an image, the apparatus comprising:

a modulator comprising an attenuation pattern configured to spatially modulate a four-dimensional (4D) light field image to generate frequency responses comprising non-uniform two-dimensional (2D) signals in the frequency domain;

a sensor configured to acquire the non-uniform 2D signals of the spatially modulated 4D light field; and a data processor configured to restore 4D light field data using the non-uniform 2D signals.

6. The apparatus of claim 5, wherein the modulator comprises:

a transparent layer; and a metal layer mounted on the transparent layer which forms the attenuation pattern and configured to attenuate light passing through the transparent layer to different degrees.

7. The apparatus of claim 5, wherein the attenuation pattern is further configured to generate a plurality of grey-scale values by:

dividing unit patterns of the attenuation pattern into a plurality of sections that each comprise a plurality of units; and shielding one or more of the units of each section to generate a grey-scale for each section.

8. The apparatus of claim 5, wherein the attenuation pattern is further configured to acquire more spatial data in a low angular frequency region and less spatial data in a high angular frequency region.

9. The apparatus of claim 5, wherein the data processor is further configured to:

apply Fourier transformation to the non-uniform 2D signals acquired by the sensor to create 2D tiles;

perform zero-padding on at least one of the 2D tiles to make the sizes of the 2D tiles uniform;

reconfigure the 2D tiles subjected to the zero-padding into a 4D tile stack; and apply an inverse-Fourier transformation to the 4D tile stack to restore 4D light field image.

10. The apparatus of claim 9, wherein the data processor is further configured to perform the zero-padding to cause the 2D tiles to have a same size as that of the largest 2D tile from among the 2D tiles.

11. The apparatus of claim 5, wherein the data processor is further configured to create at least one image from among a view image from at least one angle, a refocusing image at different depths, and a high-resolution image, using the restored 4D light field data.

12. A light field data processing method that is performed by a light field data processor, the method comprising:

spatially modulating a 4D light field image using a modulator with an attenuation pattern to acquire non-uniform two-dimensional (2D) signals of the spatially modulated 4D light field in the frequency domain; and restoring 4D light field data using the non-uniform 2D signals.

13. The light field data processing method of claim 12, wherein the restoring of the 4D light field data comprises:

applying a Fourier transformation to the non-uniform 2D signals to acquire 2D tiles;

performing zero-padding on at least one of the 2D tiles to make sizes of the 2D tiles uniform;

reconfiguring the 2D tiles subjected to the zero-padding to a 4D tile stack; and performing an inverse-Fourier transformation on the 4D tile stack to restore the 4D light field image.

14. The light field data processing method of claim 13, wherein the zero-padding is performed in such a manner that the 2D tiles have a same size as that of the largest 2D tile from among the 2D tiles.

15. The light field data processing method of claim 12, further comprising creating at least one image from among a view image from at least one angle for the scene, a refocusing image at different depths, and a high-resolution image, using the restored 4D light field data.

16. A modulator for spatially modulating light in a frequency domain, the modulator comprising:

a transparent layer; and a metal layer mounted on the transparent layer that forms an attenuation pattern that is configured to attenuate light passing through to generate frequency responses comprising non-uniform two-dimensional (2D) signals in the frequency domain.

17. The modulator of claim 16, wherein the metal layer is further configured to generate a plurality of grey-scale values by:

dividing unit patterns of the attenuation pattern into a plurality of sections that each comprise a plurality of units; and shielding one or more of the units of each section to generate a grey-scale for each section.

18. The modulator of claim 16, wherein the attenuation pattern is further configured to acquire more spatial data in a low angular frequency region and less spatial data in a high angular frequency region.

19. An image processing apparatus, comprising:

a data acquiring unit configured to receive a four-dimensional (4D) light field image and generates a plurality of non-uniform two-dimensional (2D) frequency response signals through spatial modulation in the frequency domain; and a processor configured to process a plurality of sensed non-uniform 2D frequency response signals to generate 4D light field data.

20. The image processing apparatus of claim 19, wherein the data acquiring unit comprises a modulator that includes a non-harmonic attenuation pattern configured to attenuate light passing through into the plurality of non-uniform 2D frequency response signals.

21. The image processing apparatus of claim 20, wherein:

the data acquiring unit further comprises a lens and a plurality of sensors configured to sense the non-uniform 2D frequency response signals; and the modulator is positioned between the lens and the plurality of sensors.

22. The image processing apparatus of claim 21, wherein:

the plurality of sensors are divided into sections;

each section comprises a plurality of units; and the non-harmonic attenuation pattern is further configured to block one or more units of a section to generate a grey-scale value for that section.

23. The image processing apparatus of claim 20, wherein the non-harmonic pattern is designed by combining two or more cosine signals that have a sum that has a non-harmonic characteristic.

24. The image processing apparatus of claim 20, wherein the non-harmonic pattern is designed by combining two or more sine signals that have a sum that has a non-harmonic characteristic.

25. The image processing apparatus of claim 20, wherein the non-harmonic pattern is designed by combining a combination of cosine signals and sine signals that have a sum that has a non-harmonic characteristic.

26. The image processing apparatus of claim 20, wherein the attenuation pattern is further configured to acquire more spatial data in a low angular frequency region where more spatial data is present and less spatial data in a high angular frequency region where less spatial data is present.

27. The image processing apparatus of claim 19, wherein the processor is further configured to apply a Fourier transformation to the sensed non-uniform 2D frequency response signals to acquire 2D tiles.

28. The image processing apparatus of claim 27, wherein the processor is further configured to perform zero-padding on at least one 2D tile to adjust a size of the 2D tiles to be uniform.

29. The image processing apparatus of claim 28, wherein the processor is further configured to:
   reconfigure the 2D tiles that have been subjected to zero-padding into a 4D tile stack; and
   apply an inverse-Fourier transform to the 4D tile stack to generate a 4D light field image.

30. The image processing apparatus of claim 28, wherein a result of the zero-padding is that the 2D tiles have the same size as that of the largest 2D tile from among the 2D tiles.

31. An optical mask for use in the processing of a four-dimensional (4D) image, the optical mask comprising:
   a transparent layer; and
   a metal layer attached to the transparent layer and comprising an attenuation pattern configured to:
      receive a four-dimensional (4D) light field image; and
      attenuate the 4D light image passing through into a plurality of non-uniform two-dimensional (2D) frequency response signals through spatial modulation in the frequency domain.

32. The optical mask of claim 31, wherein the attenuation pattern comprises a plurality of sections comprising a plurality of units such that each of the units is spaced apart in a range of approximately 0.1 µm to approximately 10 µm.

33. The optical mask of claim 32, wherein one or more of the units of a section are blocked to prevent light from passing through and to generate a grey-scale value for that section.

34. The optical mask of claim 31, wherein the attenuation pattern comprises a 2D non-harmonic pattern.

35. The optical mask of claim 34, wherein the non-harmonic pattern is designed by combining two or more cosine signals that have a sum that has a non-harmonic characteristic.

36. The optical mask of claim 34, wherein the non-harmonic pattern is designed by combining two or more sine signals that have a sum that has a non-harmonic characteristic.

37. The optical mask of claim 34, wherein the non-harmonic pattern is designed by combining a combination of sine signals and cosine signals that have a sum that has a non-harmonic characteristic.

38. The optical mask of claim 31, wherein the attenuation pattern is further configured to acquire more spatial data in a low angular frequency region and less spatial data in a high angular frequency region.

* * * * *